United States Patent
Shimizu et al.

(10) Patent No.: US 6,721,631 B2
(45) Date of Patent: Apr. 13, 2004

(54) METHOD FOR REMOTE MONITORING OF GAS TURBINE

(75) Inventors: Yujiro Shimizu, Takasago (JP); Masumi Nomura, Takasago (JP); Shigeo Okamoto, Takasago (JP); Yasuhiko Ikegami, Takasago (JP); Isao Sagawa, Takasago (JP); Tsutomu Sakagami, Takasago (JP); Katsunori Tanaka, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 53 days.

(21) Appl. No.: 10/031,329

(22) PCT Filed: May 18, 2001

(86) PCT No.: PCT/JP01/04161
§ 371 (c)(1),
(2), (4) Date: Jan. 18, 2002

(87) PCT Pub. No.: WO01/88355
PCT Pub. Date: Nov. 22, 2001

(65) Prior Publication Data
US 2003/0014219 A1 Jan. 16, 2003

(30) Foreign Application Priority Data
May 18, 2000 (JP) ..................................... 2000-146887

(51) Int. Cl.[7] .............................................. G05D 11/00
(52) U.S. Cl. .................... 700/287; 700/286; 700/290
(58) Field of Search ......................... 700/280, 286–290; 340/3.1; 60/805

(56) References Cited

U.S. PATENT DOCUMENTS

| 4,075,059 A | * | 2/1978 | Bruno et al. ............... 376/217 |
| 4,488,240 A | | 12/1984 | Kapadia et al. |
| 4,575,803 A | | 3/1986 | Moore |
| 4,687,946 A | * | 8/1987 | Jones ....................... 290/40 R |

(List continued on next page.)

FOREIGN PATENT DOCUMENTS

| JP | 54-114630 | 9/1979 |
| JP | 6-261378 | 9/1994 |
| JP | 10-13973 | 1/1998 |
| JP | 11-324725 | 11/1999 |

OTHER PUBLICATIONS

Keisuke et al. Translated Japanese Publication No. 11–324725, Published Nov. 26, 1999.*
Mitsuaki et al. Translated Japanese Publication No. 06–261378, Published Sep. 16, 1994.*

*Primary Examiner*—Leo Picard
*Assistant Examiner*—Alexander Kosowski
(74) *Attorney, Agent, or Firm*—Oblon, Spivak, McClelland, Maier & Neustadt, P.C.

(57) ABSTRACT

The state of combustion oscillation in the combustor of a turbine of a power plant is monitored from a remote monitoring center. To monitor the combustion oscillation state, combustion oscillation data on the combustor is separated into two types of data: the first data obtained on a real-time basis, and the second data including representative values within a predetermined period of time obtained from the first data. In the normal state, a low-speed communications mode is used to send the second data, which is monitored at the monitoring center. If an abnormal state is predicted as a result of monitoring the second data, the high-speed communications mode is used to send the first data, and more detailed combustion oscillation data is monitored at the monitoring center. When a critical state is predicted, an instruction is sent to the local site to switch the operation mode over to the low load operation mode.

15 Claims, 9 Drawing Sheets

U.S. PATENT DOCUMENTS

| | | | |
|---|---|---|---|
| 5,349,811 A | * 9/1994 | Stickler et al. | 60/776 |
| 5,397,183 A | 3/1995 | Lu et al. | |
| 5,760,289 A | 6/1998 | Skottegard | |
| 5,838,588 A | * 11/1998 | Santoso et al. | 700/287 |
| 5,845,230 A | * 12/1998 | Lamberson | 702/56 |
| 6,138,081 A | 10/2000 | Olejack et al. | |
| 6,484,109 B1 | * 11/2002 | Lofall | 702/56 |
| 6,489,884 B1 | * 12/2002 | Lamberson et al. | 340/7.2 |

* cited by examiner

FROM COMPRESSOR        TO TURBINE

METHOD FOR REMOTE MONITORING OF GAS TURBINE

TECHNICAL FIELD

The present invention relates to a remote monitoring method for a gas turbine installed in a power plant or the like, and particularly to a remote monitoring method and its system capable of preventing the turbine components from being damaged by resonance with combustion oscillations in a turbine.

BACKGROUND ART

In a gas turbine operating at a power plant or the like, compressed air from the compressor and gaseous fuel are fed to a combustor and the turbine is driven by combustion gas of a high temperature resulting from combustion in the combustor. Moving vanes are installed around the rotary shaft of the turbine for the compressor and turbine. The moving vanes for the turbine are driven by high temperature combustion gas supplied from the combustor. In the combustor, a fuel nozzle for feeding main fuel and a pilot nozzle for feeding pilot fuel are installed inside a combustor sleeve. Fuel and air discharged from the compressor are mixed and burnt, and combustion gas is fed into the turbine from the tail sleeve of the combustor. In recent years, a gas turbine is designed with consideration given to environmental issues, and efforts have been made to cut down the amount of NOx emission. Especially in the pilot nozzle, for which pre-mixing with air is not performed, diluted fuel gas is used. Use of this diluted fuel gas raises a problem of making combustion in the combustor unstable, pulsating the flow of combustion gas and increasing oscillations associated with the combustion. Similarly, in order to save energy, it is also necessary to raise operating temperature so as to increase efficiency. This requires more fuel to be burnt and makes combustion in the combustor unstable.

Combustion oscillation can be controlled to some extent, for example, by adjusting the air-fuel ratio (A/F ratio), the pilot ratio and the angle of opening of a bypass valve. During initial operations after the gas turbine is installed, it is possible to make adjustment so as to reduce combustion oscillations. As described above, however, in recent designs of gas turbines that are characterized by a reduced amount of NOx emission, higher operating temperatures and improved efficiency, combustion oscillation will restart as the equipment deteriorates after extended operations. In the worst case, parts may be damaged due to resonance with natural frequencies of bolts, nuts and other component parts of the combustor and turbine.

To solve the problems in such a plant as a power plant equipped with a gas turbine, a proposal has been put forward to monitor gas turbine operation parameters via a communications line at a remote monitoring center and to supervise operational conditions. It is possible to consider that the state of the aforementioned combustion oscillation is monitored from the remote monitoring center to ensure that combustion oscillations will not exceed a predetermined level. In order to monitor the state of combustion oscillations at the monitoring center, however, it is necessary to send and monitor a large amount of oscillation data via the communications line with a higher frequency than characteristic frequency of turbine operation.

To send such a large amount of combustion oscillation data, however, only a communications method wherein a telephone line such as ISDN is connected by line switching method can be utilized among the currently used data communications methods. But such a high-speed communications method involves a high communications cost. Thus, a very high cost is required to supervise a gas turbine in the plant built in an overseas country from the domestic monitoring center, and its feasibility is considered very low. As a result, maintenance of a gas turbine characterized by high temperature, high efficiency and low NOx rate has to be provided by a supervisor stationed in the local plant.

In this case, a special skill based on a comparatively long experience is required in order to monitor the state of combustion oscillations and evaluate whether parts will be damaged in advance. It is not easy to find out a skilled engineer to meet such requirements. In practice, it is difficult to have a skilled engineer stationed at a local site, and so an engineer will have to be dispatched after the power plant has been tripped due to damaged parts.

DISCLOSURE OF THE INVENTION

One of the objects of the present invention is to provide a remote monitoring method and system for monitoring the state of combustion oscillations in a turbine combustor from a remote monitoring center. Another object of the present invention is to provide a remote monitoring method and system for preventing parts from being damaged by resonance with turbine combustion oscillation. A further object of the present invention is to provide a remote monitoring method for monitoring from a remote monitoring center a predetermined state which causes the turbine to trip.

To achieve the above objects, the first aspect of the present invention is characterized by monitoring at a remote monitoring center the state of combustion oscillation in the turbine combustor in, for example, a power plant where the turbine is installed. To monitor the state of combustion oscillation, the present invention uses a combination of a low-speed communications mode utilizing the Internet and a high-speed communications mode based on a line switching method such as ISDN. The Internet provides a comparatively low-cost communications means, but it is not suited for a high precision transmission of a large amount of data because of its low speed. The ISDN-based line switching method allows a communications line to be established between the plant and monitoring center to perform data communications. It ensures a high-speed and high-precision transmission of a large amount of data with high degree of security, but the communications cost is not low. According to the present invention, data on combustion oscillation in combustor is separated into two types: first data obtained on a real-time basis and second data consisting of representative values within a predetermined period of time obtained from the first data. During normal operation, the second data is transmitted in a low-speed communications mode of the Internet or the like and monitored at a monitoring center. If any abnormal condition is predicted as a result of monitoring the second data, the first data is transmitted in a high-speed communications mode of ISDN or the like, and combustion oscillation data is monitored in greater details at the monitoring center. If a critical problem is predicted, an instruction is sent to the local site to switch the operation mode over to a low-load operation mode, whenever required.

In a preferred embodiment of the present invention, data on combustion oscillation in combustor is separated into two types: frequency spectrum data (the first data) of oscillation level obtained by Fourier transformation from the oscillation waveform subjected to real-time sampling, and peak value data (the second data) of resonance frequency bands obtained therefrom within a predetermined period of time. During normal operation, the Internet is used to send the peak value data, and when abnormal conditions are found characterized by severe combustion oscillation, ISDN is utilized to send frequency spectrum data. This allows the remote monitoring center to predict the abnormal state of the turbine by monitoring peak value data during normal operation. When a symptom for abnormal conditions is observed, frequency spectrum data received via ISDN is monitored by the center. Immediately before combustion oscillations increase to the extent of damaging turbine component parts, the center issues an instruction to the local site to switch the operation mode over to the low-load operation mode, thereby preventing the turbine parts from being damaged and the plant from tripping.

To achieve the above object, the second aspect of the present invention is characterized in that, in the aforementioned first aspect, a symptom detection computer for detecting the symptom of a critical state is installed in the plant and this computer checks whether a combination of the peak value data and turbine operation parameter values is similar to the past reference data which was obtained when a symptom of the critical state was detected. If a symptom is detected, an alarm is issued to the plant.

Even if the peak value data based on which the symptom for critical state is detected is different, more accurate symptom detection in conformity to the operation state can be performed by checking if a combination of the peak value data and operation parameter values is close to the reference data.

BEST MODE FOR CARRYING OUT THE INVENTION

The following describes the embodiments of the present invention with reference to drawings; however, it should not be understood that the present invention is limited only to those embodiments described below.

Figure 1:
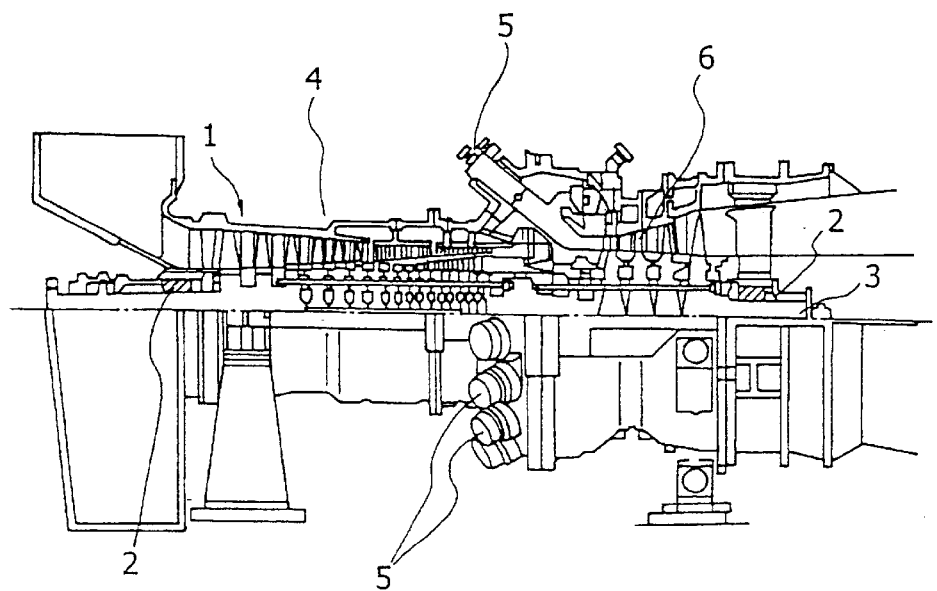
FIG. 1 is a schematic diagram representing an example of a gas turbine as an embodiment of the present invention.

FIG. 1 is a schematic diagram representing an example of a gas turbine as an embodiment according to the present invention. In the gas turbine, a rotor 3 as a rotating member is supported via a bearing. Air compressed by a compressor 4 on the left and fuel gas supplied to the combustor 5 at the center are mixed with each other and burnt in a combustor 5. Combustion gas expanded by high temperature is supplied to the turbine on the right, and the moving vane of the turbine is turned by thrust force. Accordingly, multiple combustors 5 are installed around the rotor. Furthermore, rotation of the turbine is used as generator driving power, for example.

Figure 2:
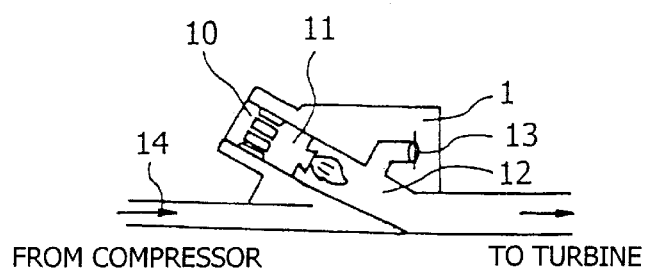
FIG. 2 is a schematic diagram representing a combustor 5.

FIG. 2 is a schematic diagram representing a combustor 5. The combustor 5 comprises a main nozzle and pilot nozzle 10 where a main fuel pre-mixed with air and a pilot fuel not pre-mixed with air are fed respectively, a compressed air outlet 14 to which compressed air mixed with main fuel is supplied from a compressor, a combustor internal sleeve 11 in which flame is produced by combustion, a combustor external sleeve 12 for feeding combustion gas to the turbine, and a bypass valve 13.

As described above, to meet the requirements for low NOx emission, fuel gas for the pilot nozzle must be diluted. This results in unstable combustion and causes combustion gas to pulsate in the combustor. Thus, combustion oscillations result from pressure fluctuations. Furthermore, in order to meet the requirements for higher efficiency and to increase the output ratio for a predetermined amount of fuel, the amount of main fuel tends to increase, further increasing combustion oscillations occurring due to the requirement of lower NOx emission. Combustion oscillations include oscillations in a frequency region covering the natural frequencies of combustor parts. If the oscillation level in the frequency region of their natural frequencies exceeds a predetermined value, these parts will be damaged. Before such a combustion oscillation level is reached, it is preferred to provide control in such a way that the operation mode is switched over to a low load operation mode.

Accordingly, a gas turbine meeting the requirements for lower NOx emission and higher efficiency is required to monitor this combustion oscillation at all times and to provide control in such a way that the critical state will never be reached.

A gas turbine may be subjected to shaft oscillations as a result of high-speed rotation of the rotor. Such shaft oscillations must also be monitored and controlled at all times to ensure that the critical value will not be exceeded.

However, in order to monitor predetermined data concerning combustion and shaft oscillations and predict a critical state before it is reached, an engineer is required to have a professional skill backed up by a long-term experience. Such a qualified engineer must be stationed in a plant provided with a gas turbine designed for lower NOx emission and higher efficiency. Due to a limited number of such skilled engineers, however, installation and spread of such a gas turbine designed for lower NOx and higher efficiency have still hurdles to overcome.

Figure 3:
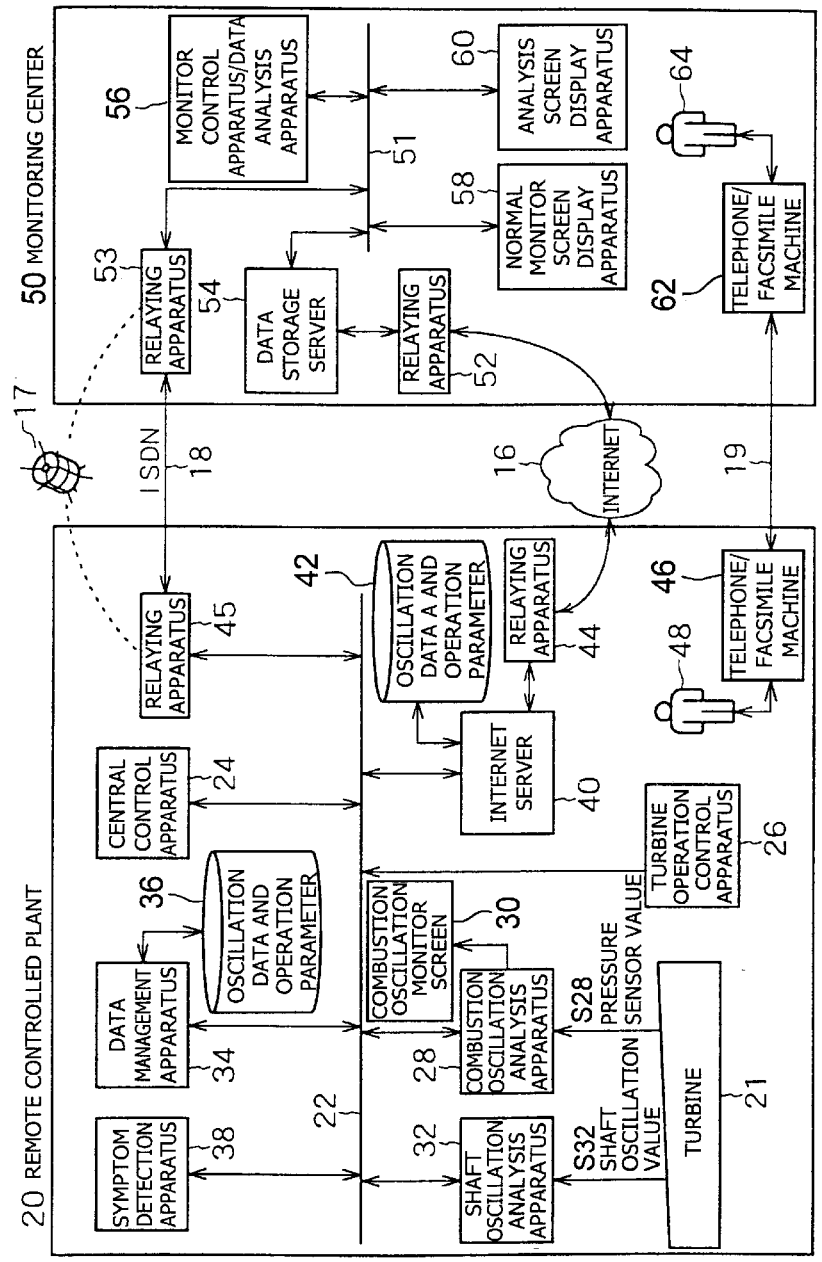
FIG. 3 is a drawing illustrating a remote monitoring method as an embodiment of the present invention.

FIG. 3 is a drawing illustrating a remote monitoring method as an embodiment according to the present invention. FIG. 3 indicates a remote controlled plant 20 where a gas turbine 21 is installed, and a monitoring center 50 accessed with this plant via communications lines 16, 18 and 19. Various computers are connected to the plant 20 via a purpose-built network 22. The plant 20 contains a central control apparatus 24 for overall control of the plant and a turbine operation control apparatus 26 for providing a predetermined operation control by obtaining operation parameter values for the gas turbine 21 including temperature, pressure and oscillation at various parts of the turbine, various control signals and turbine output (rpm). In the central operation room where a turbine operation control apparatus 26 and central control apparatus 24 are installed, a plant operator 48 is stationed to provide gas turbine operation control.

In the plant 20 there are installed a combustion oscillation analysis apparatus 28 for obtaining a sensor value S28 from the pressure sensor installed in the combustor of the gas turbine 21 and for analyzing combustion oscillations, and a combustion oscillation monitor screen 30 for displaying combustion oscillation data for the combustion oscillation monitor. The plant also contains a shaft oscillation analysis apparatus 32 for analyzing shaft oscillation by acquiring shaft oscillation value S32 associated with the rotation of the rotor. The plant further includes a data management apparatus 34 for managing the operation parameters obtained by the turbine operation control apparatus 26 and oscillation data obtained by the shaft oscillation analysis apparatus 32 in the combustion oscillation analysis apparatus 28, as well as a data file 36. As will be described later, a symptom detection apparatus 38 is an apparatus for detecting a symptom of the critical state in combustion oscillations automatically based on combustion oscillation data obtained by the combustion oscillation analysis apparatus 28.

The combustion oscillation analysis apparatus 28 acquires on a real time basis the sensor value S28 sent from a pressure sensor mounted on the combustor of the gas turbine 21. This sensor value is subjected to analog-to-digital conversion after a filter has removed noise. Combustion oscillation data for every two seconds, for example, is subjected to Fourier transformation to obtain a frequency spectrum on the oscillation level. Furthermore, concerning the oscillation level for the natural frequencies of the combustor and its surrounding component parts obtained from frequency spectrum, peak value data within a predetermined period of time is also obtained. The frequency spectrum of the combustion oscillations and peak value data are displayed on the combustion oscillation monitor screen 30.

Figure 4:
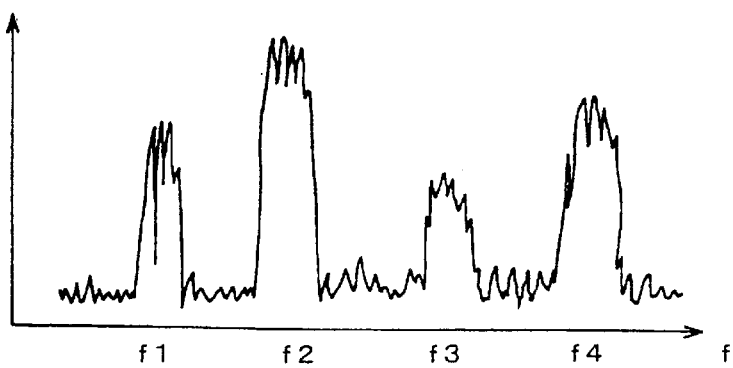
FIG. 4 is a diagram representing an example of a combustion oscillation frequency spectrum.

FIG. 4 is a diagram representing an example of a combustion oscillation frequency spectrum. The horizontal axis represents frequency f, and the vertical axis indicates oscillation levels. In the example given in FIG. 4, four natural frequencies f1, f2, f3 and f4 are included in the frequency region. The combustion oscillation data in FIG. 4 is data obtained on a real time basis. The speed is increased with the passage of time, and a large amount of data is contained.

Figure 5:
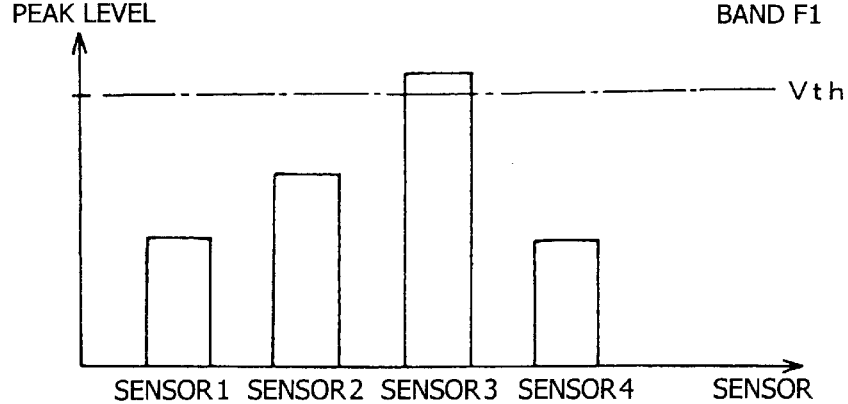
FIG. 5 is a diagram representing an example of a peak value of combustion oscillation level.

FIG. 5 is a diagram representing an example of a peak value of combustion oscillation levels. The horizontal axis represents a sensor installed on the combustor and the vertical axis indicates a peak value on the oscillation level within a predetermined period of time. The example of FIG. 5 shows the one-minute peak value in a frequency region near natural frequency f1, for example. The sensor 3 showing the value in excess of threshold value level Vth has a symptom of reaching the critical state. This peak value represents data 10, which is changing every ten seconds, and the amount of data is smaller than that of the frequency spectrum in FIG. 4.

Figure 6:
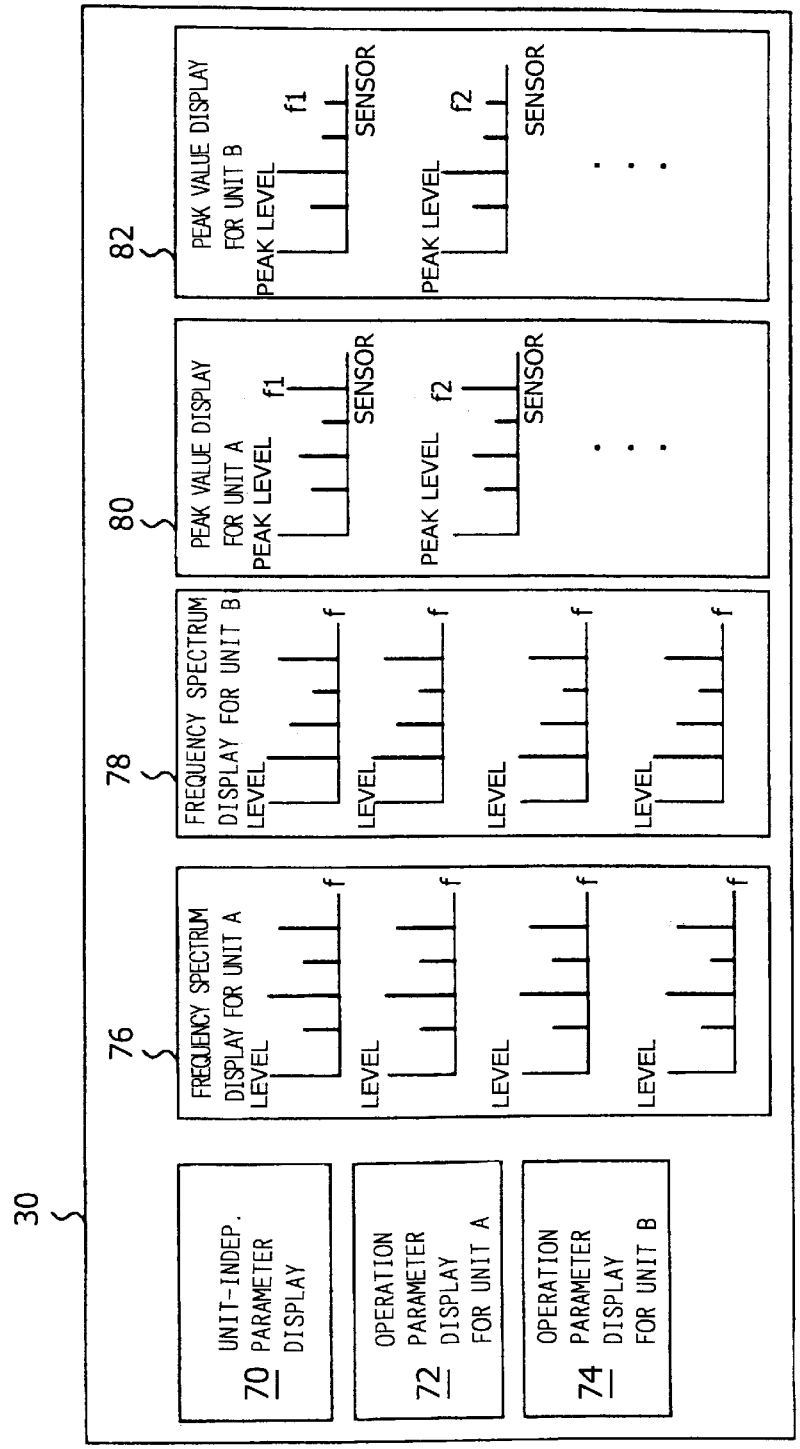
FIG. 6 is a diagram representing an example of a combustion oscillation monitoring screen provided in a plant.

FIG. 6 is a diagram representing an example of a combustion oscillation monitoring screen provided in a plant.

This example in FIG. 6 shows a case in which two gas turbines are provided. The combustion oscillation monitor screen 30 contains an area 70 indicating operation parameters (e.g. plant power value) common to both units, areas 72 and 74 indicating operation parameters for units A and B, frequency spectrum indication areas 76 and 78 for units A and B, and peak value indication areas 80 and 82 for units A and B.

As described above, operation parameters are the data used for gas turbine operation control. The frequency spectrum indicates real-time combustion oscillation data. The peak value shows the combustion oscillation data represented within a predetermined period of time. These pieces of data are displayed simultaneously on a large-screen display device and are monitored by an operator 48.

Accordingly, if an operator 48 in the plant has an advanced level of technical skill, the state of combustion oscillation can be monitored by watching this monitor screen while turbine operations are controlled. For example, when a new plant is constructed, a skilled engineer watches this monitor screen and can adjust values settings for operation control in such a way that the combustion oscillation level will be the lowest. In order to watch this monitor screen and to predict the possibility of combustion oscillations reaching the critical state even after commencement of plant operation, however, it is necessary to station an engineer who is sufficiently skilled in the related art.

Turning back to FIG. 3, the state of combustion oscillation can be monitored at a monitoring center 50 remote from the plant 20 according to the present embodiment. The monitoring center 50 receives combustion oscillation data via the communications line. The communications line to be used consists of a combination of two methods: (1) the Internet 16 or the like which provides a low speed communications mode at a comparatively low communications cost although it is not suited for high-speed transmission of a large amount of data, and (2) a telephone line 18 such as ISDN which provides a high-speed communications mode characterized by high-speed and high-precision transmission of a large amount of data at high communication costs. The Internet 16 allows a constant connection between the Internet servers, and provides a communications mode featuring packet communication of data. By contrast, ISDN 18 uses a line switching system wherein a communications line is established between the sender and receiver at the time of communication. If data communications method by ISDN cannot be used as a high-speed communications mode, it is possible to use satellite communications 17 such as services provided by INMARSAT (International Maritime Satellite organization).

With considerations given to the properties of the two types of communication modes, turbine operation parameters as well as peak value data taken out of combustion oscillation data are sent full-time to the monitoring center 50 via the Internet 16. Accordingly, the plant 20 is provided with an Internet server 40, a file 42 for storing the combustion oscillation data (peak value data) and operation parameter values, and a relaying apparatus (router) 44. Furthermore, the monitoring center 50 is provided with a server 54 as a similar Internet server for storing received data, and a relaying apparatus (router) 52. To put it more specifically, the server 54 on the side of the monitoring center 50 accesses the server 40 in a remote plant to receive operation parameters and combustion oscillation data (peak value data).

Figure 7:
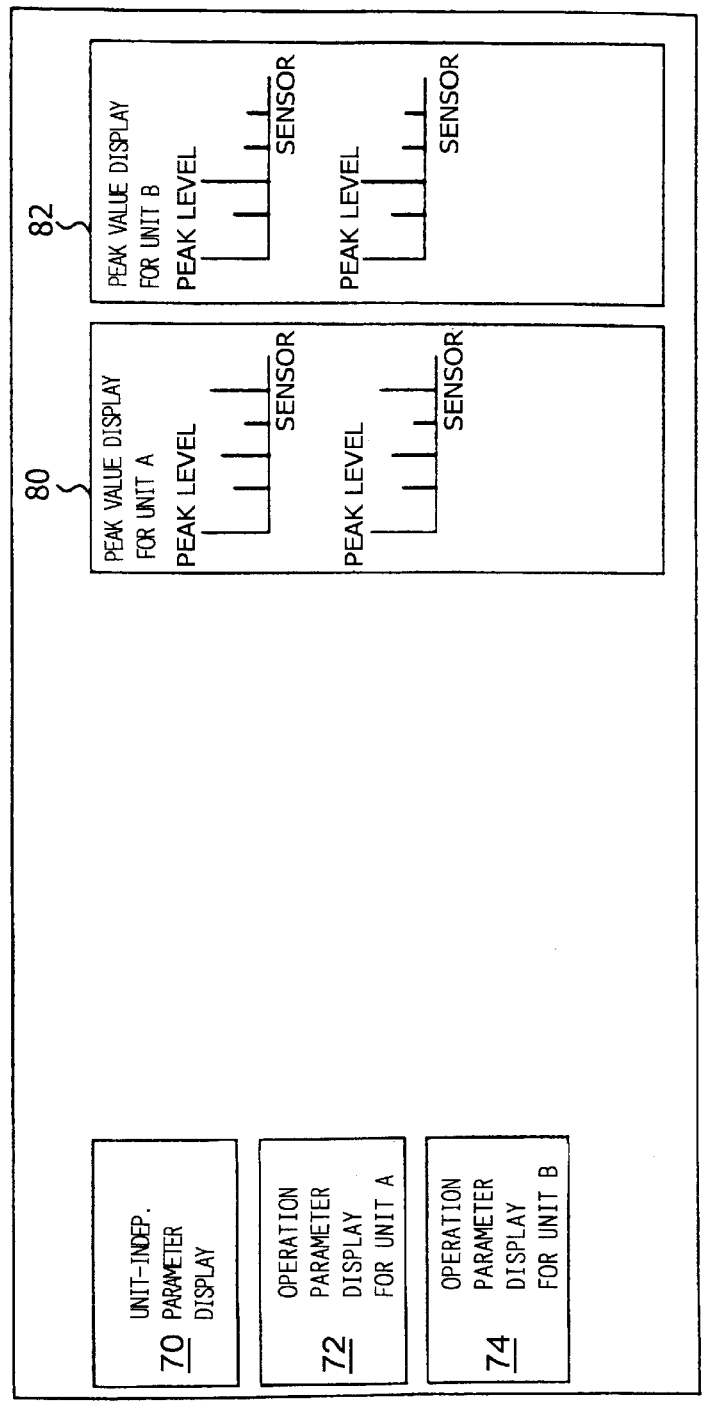
FIG. 7 is a diagram representing an example of a normal monitoring screen in a monitoring center.

The operation parameter values and combustion oscillation data (peak value data) obtained full time by the Internet are displayed on a normal monitor screen display apparatus 58 in the monitoring center. An example of this display screen is shown in FIG. 7. According to the example of FIG. 7, a unit-independent parameter display 70 in the combustion oscillation monitor screen 30 in the plant of FIG. 6, operation parameter displays 72 and 74 for units A and B, and peak value indications 80 and 82 for units A and B are shown. These displays are given via the Internet 16 based on operational parameter data to be received full time and representative data within a predetermined period of time taken from the combustion oscillation data.

The monitoring center 50 receives the above-mentioned data from multiple remote plants 20 via the Internet and displays the screen of FIG. 7 by means of the normal monitor screen display apparatus 58, and a skilled engineer 64 stationed at the monitoring center 50 monitors combustion oscillations for each plant. The peak value indication represents a peak value in natural frequency band within a predetermined period of time. Unlike the real-time frequency spectrum, it cannot monitor the details of the combustion oscillation state, but allows any symptom suggestive of an abnormal state or conditions to be detected by the skilled engineer 64. When the skilled engineers 64 has detected such a symptom, the connection through an ISDN line 18 is established with the plant 20 by a relay apparatus 53, and the data of real-time frequency spectrum can be gained from the plant 20. This frequency spectrum data is displayed by an analysis screen display apparatus 60, and the skilled operator 64 monitors combustion oscillations in much the same way as at the local plant.

When a prediction is made that combustion oscillations will reach a predetermined critical state, an instruction is sent to an operator at a local plant to reduce gas turbine power by telephone or facsimile through a telephone line 19, for example. When combustion oscillations have come back to the normal state, the reception of real-time frequency spectrum is stopped through ISDN 18, with the result that only the data concerning peak values is received through the Internet 16.

As can be seen, the peak value data concerning combustion oscillations which is comparatively small in amount is received at the monitoring center 50 via the internet, which is characterized by a lower speed, in the normal state for lower communications costs, and a skilled engineer 64 monitors operation. Furthermore, when a symptom of abnormal conditions is detected, the frequency spectrum of combustion oscillations, which is comparatively large in amount, is received via ISDN 18 capable of higher-speed transmission for a large amount of data, in spite of its higher communication costs, and the skilled engineer 64 monitors operation in detail.

Figure 8:
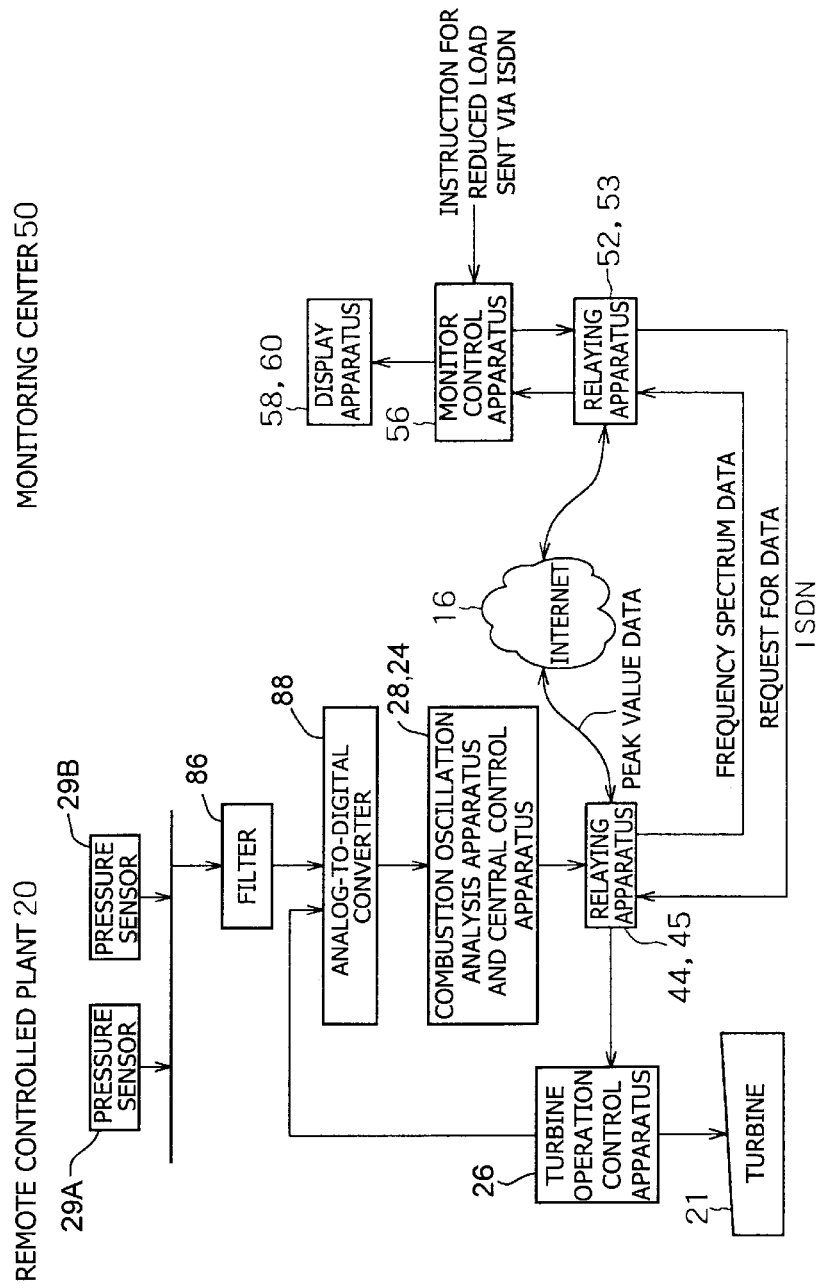
FIG. 8 is a diagram illustrating data flow in the first embodiment.

FIG. 8 is a diagram illustrating data flow in the first embodiment. At the local plant 20 on the left, the pressure value sent from pressure sensors 29 provided in the internal and external sleeves of multiple combustors of the gas turbine 21 is converted into digital values by an analog-to-digital converter 88 after a filter 86 has removed noise. Pressure fluctuations resulting from combustion oscillations have a high frequency, and this requires correspondingly high frequency sampling.

Sensor pressure value S28 converted into digital data is processed inside the combustion oscillation analysis apparatus 28 and formed into frequency spectrum data and peak value data. The resulting data is displayed on the combustion oscillation monitor screen 30. At the same time, the central control apparatus 24 analyzes combustion oscillation data.

Figure 9:
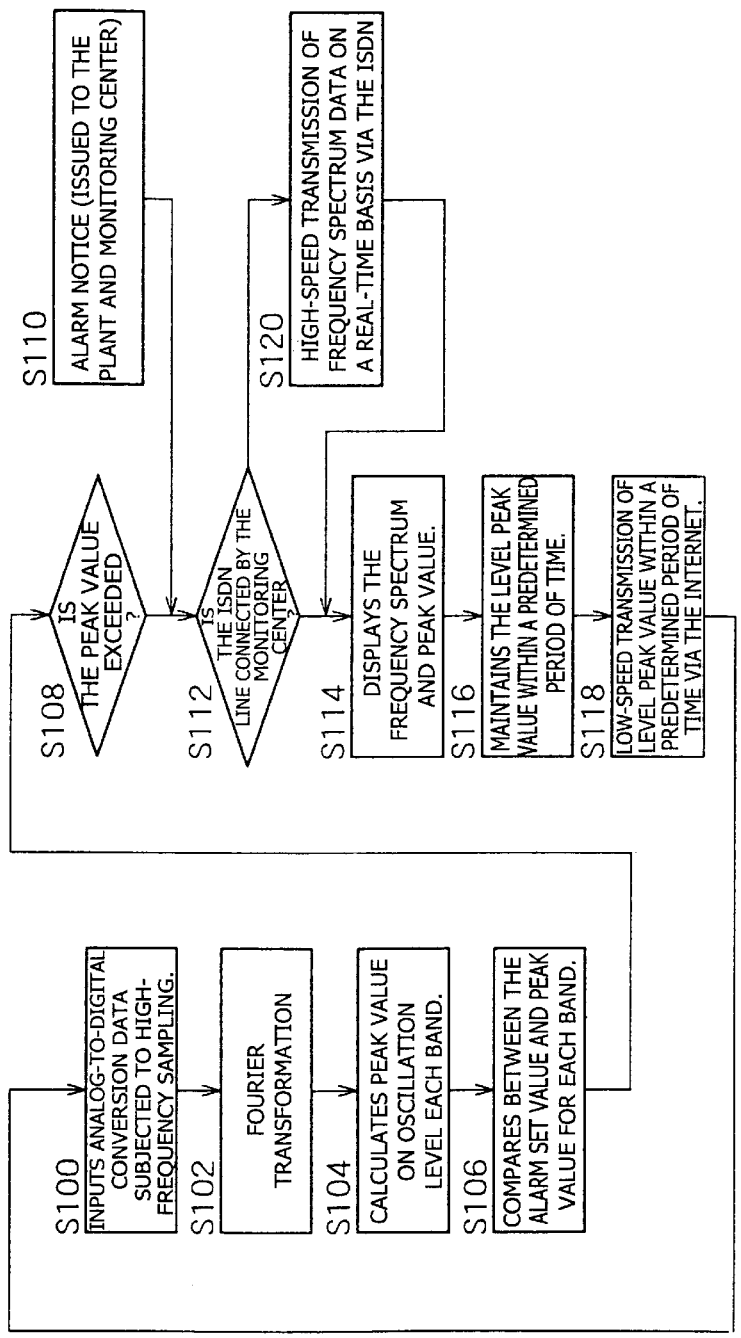
FIG. 9 is a flowchart representing the operation of a combustion-oscillation analysis apparatus and a central control apparatus.

FIG. 9 is a flow chart representing the operation of a combustion oscillation analysis apparatus and a central control apparatus. The operation in FIG. 8 is represented in FIG. 9. First, analog-to-digital conversion data subjected to high-frequency sampling as to pressure sensor value is input (S100). This analog-to-digital conversion data is subjected to Fourier transformation (S102). The data to be subjected to Fourier transformation is a real-time pressure value at intervals of 2 seconds, for example. Fourier transformation can be carried out in two different bands, for example; a high frequency band and low frequency band. This allows oscillation level spectrum in a wide frequency band to be generated. For frequency spectra, peak value on oscillation level is calculated for each band of the natural frequency of combustor parts (S104). Accordingly, this peak value is real-time data (at intervals of 2 seconds).

Comparison is made between the alarm set value (threshold value Vth) for each band and calculated peak value (S106). If the peak value exceeds the alarm set value, an alarm notice is issued to the plant and monitoring center (S110). An alarm notice for the monitoring center can be sent by Internet-based communications.

In the normal state, access to the ISDN line is not made from the monitoring center. The combustion oscillation analysis apparatus 28 in the plant allows the frequency spectrum and peak value to be displayed on the combustion oscillation monitor screen 30 (S114), as shown in FIG. 6. The central control apparatus 24, for example, maintains the peak value for each band for a period of one minute (S116), and allows it to be stored in the file apparatus 42 of the Internet server 40. The operation parameter values obtained by the turbine operation control apparatus 26 are also stored in the file apparatus 42. In response to the requirements for acquisition of the data from the server 54 of the monitoring center 50, the Internet server 40 sends the peak value stored in the file apparatus 42 and operation parameter values to the server 54 in the monitoring center 50 via the Internet 16.

Data transmission by the Internet can be carried out in various ways. The peak value data for each band is changed once in every minute in the above example, so one transmission in every minute is sufficient. Alternatively, peak value data for multiple combustors can be sent at multiple times within one-minute cycle. The mode of transmission is determined in conformity to the optimization of the system.

Turning back to FIG. 8, the monitoring center 50 receives peak value data and operation parameter values via the Internet, and they are displayed on the normal monitor screen display apparatus 58, as shown in FIG. 7. This normal monitor screen is monitored full time by the skilled engineer 64 stationed at in the monitoring center. While monitoring the minute-by-minute peak value indication of the combustion oscillation in the combustor, the monitoring center 50 connects the ISDN line 18 to the plant as appropriate, and requests real-time frequency spectrum data. This corresponds to the case where the skilled engineer 64 has predicted from the change in peak values a symptom of combustion oscillations having reached the abnormal state. Alternatively, in response to the alarm notice from the plant, the ISDN line 18 is connected to the plant to request the real-time frequency spectrum. This allows an indication to be given on the analysis screen display apparatus 60 as shown in FIG. 6, and permits the engineer 64 to monitor the detailed combustion oscillation.

Turning back to FIG. 9, when the central control apparatus 24 in the plant 20 is connected to the ISDN line 18 from the monitoring center 50 as shown in step S112 and a request is made, frequency spectrum data is returned to the monitoring center 50 on a real-time basis (S120).

At the monitoring center 50, the skilled engineer 64 monitors the frequency spectrum of combustion oscillation on a real-time base. Upon detection of a symptom leading to the critical state, the skilled engineer 64 makes contact with the operator 48 in the plant 20 via, for example, a telephone or a facsimile machine 62, and gives an instruction to perform operations which reduces the load of the gas turbine. This prevents the gas turbine 21 in the plant from tripping due to component parts of the combustor being damaged by combustion oscillations.

Figure 10:
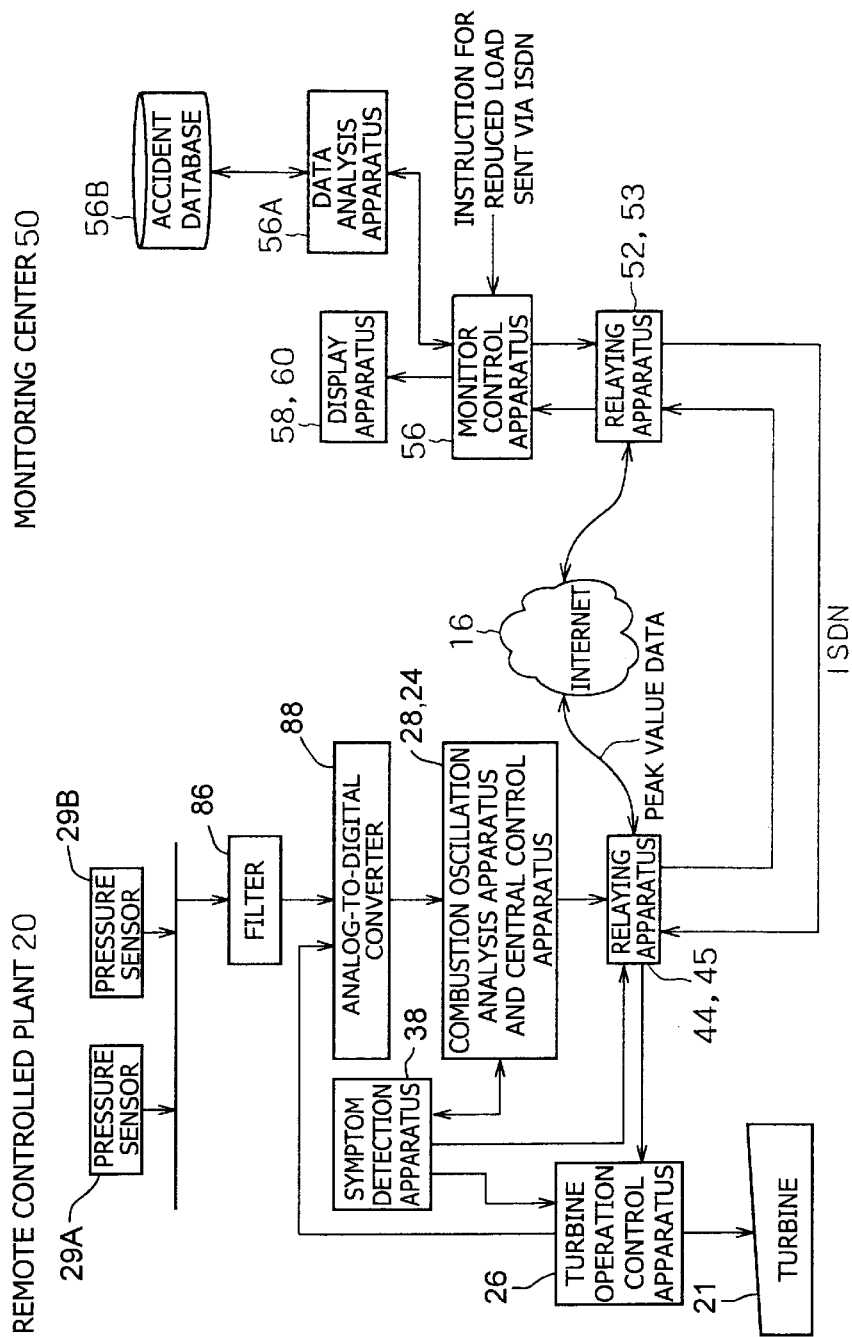
FIG. 10 is a diagram representing the flow of data in a second embodiment.
Figure 11:
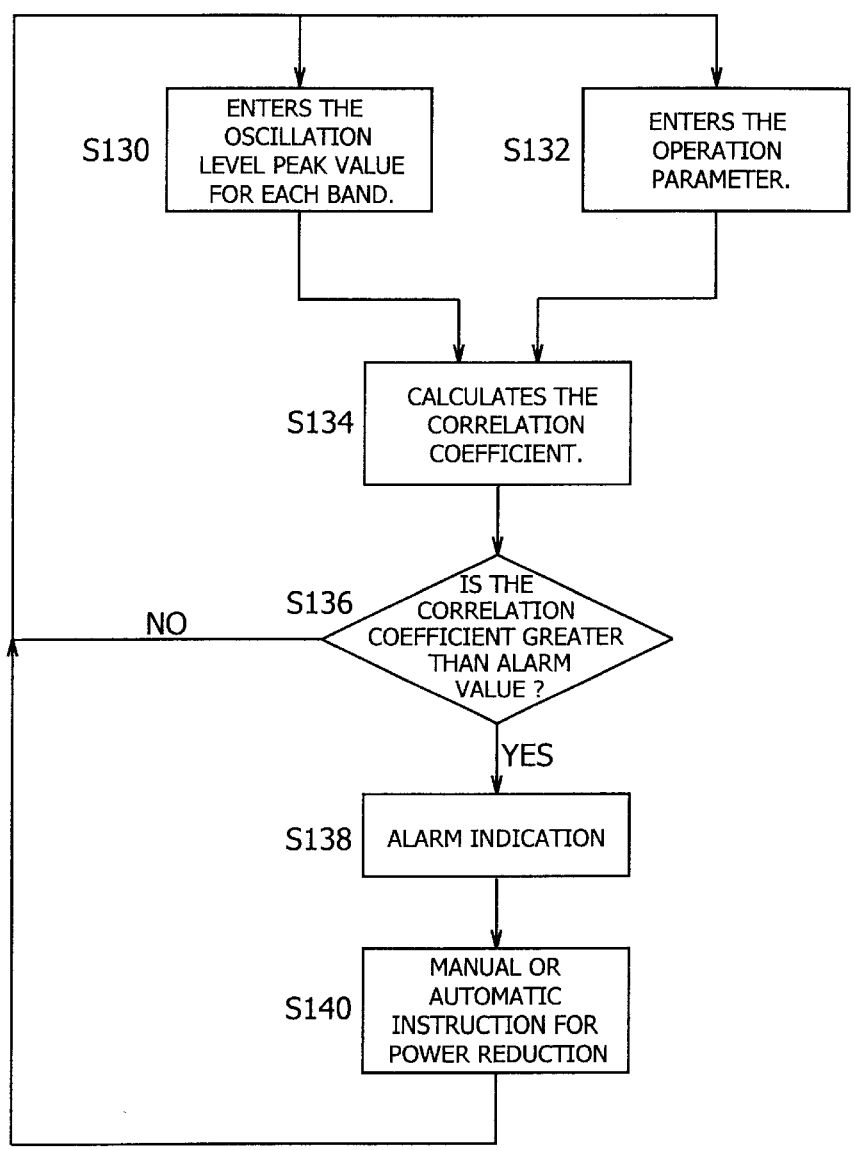
FIG. 11 is a flowchart showing the operation of a symptom detection apparatus 38.

FIG. 10 is a diagram representing the flow of data in a second embodiment. FIG. 11 is a flowchart showing the operation of a symptom detection apparatus 38. In the first embodiment, an engineer in the monitoring center monitors the indicated peak values of combustion oscillations. Upon prediction of a symptom of an abnormal state, the frequency spectrum of combustion oscillations is received via the ISDN line, and more detailed monitoring is performed. In the second embodiment, by contrast, a symptom detection apparatus 38 is installed in the plant to detect a symptom of combustion oscillations having reached a critical state. Then, an alarm is issued to instruct low load operations to be performed in the plant, or to allow the turbine operation control apparatus 26 to automatically perform operations to reduce power.

In the second embodiment, the monitoring center receives operation parameters and the peak value data of combustion oscillation via the Internet 16 during normal operation. When a symptom of an abnormal state has been detected or more detailed monitoring is required for any other reasons, the frequency spectrum data of combustion oscillation is received on a real-time basis via an ISDN line. In the second embodiment, furthermore, the symptom detection apparatus 38 checks whether or not a combination of the peak value data concerning combustion oscillations and operation parameter values shows a predetermined correlation with a combination data when combustion oscillations have reached an abnormal or critical state. When such a correlation is detected, alarm is issued to urge the operation mode to be switched over to the low load operation, or to give an instruction to automatically switch the turbine operation control apparatus 26 over to the low load operation mode. The aforementioned alarm notice and instruction 10 for switching the operation mode over to the low load operation are also reported to the monitoring center 50 via the Internet 16 or ISDN line 18 (if connected).

FIG. 11 is a flowchart showing the operation of a symptom detection apparatus 38. The symptom detection apparatus enters the band-by-band oscillation level peak value of combustion oscillation in the file apparatus 36 of the data management apparatus 34 (S130), as well as the operation parameter at that time (S132). As described above, the peak value is the maximum one-minute band-by-band value of the natural frequency gained from frequency spectrum acquired on a real-time basis. The peak value when combustion oscillation reaches the abnormal state or critical state differs according to the operation parameter. Accordingly, it is necessary to check the combination between the peak value data and operation parameter.

The symptom detection apparatus 38 stores the data consisting of a combination between the peak value data and operation parameter when the combustion oscillation in the combustor previously reached the abnormal state or critical state. Calculation is made of the correlation between this stored data and the combination data between the input peak value and operation parameter (S134). If the calculated correlation is largeer than the alarm value, namely, if it is found out to be similar or approximate to the combination data of previous abnormal state and critical state (S136), then an alarm is indicated, and an instruction is sent to the operator 48 in the plant to switch the operation mode over to the low load operation mode (S138 and S140). Alternatively, the symptom detection apparatus 38 can send an instruction automatically to the turbine operation control apparatus 26 to switch the operation mode over to the low load operation mode.

In the second embodiment, in addition to the monitoring of combustion oscillations, the monitoring center checks, using a computer, whether or not a combination data between the current peak value data and combustion parameter values are similar or close to the data obtained during previous abnormal events. Thus, the second embodiment reduces the probability of tripping caused by combustion oscillations more conspicuously than the first embodiment.

FIG. 10 shows a variation of the second embodiment. In this example, a data analysis apparatus 56A is provided in the monitoring center 50. The past data is recorded in a file apparatus 56B to show how the gas turbine came to reach the abnormal state or critical state or how tripping occurred. Then data patterns of the past accidents are analyzed by means of a data analysis apparatus 58A, thereby preventing an accident from occurring in future. Especially operation parameters to show how the instruction was sent from the monitoring center to the plant to request switching of the operation mode over to the low load operation mode, as well as combustion oscillation peak value and frequency spectrum data are recorded and analyzed. The data accumulated in the aforementioned manner and the result of analysis are reflected on the set value data of the symptom detection apparatus of the plant 20.

In the aforementioned examples, the gas turbine has been described. The above description is also applicable to a turbine based on fuel other than gas. Furthermore, combustion oscillations are monitored at the monitoring center in the above description. Similarly, it is also possible to provide remote monitoring with reduced communications costs by transmitting real-time data on the oscillation of, for example, the turbine rotor shaft via an ISDN line and representative data within a predetermined period of time via the Internet.

As described above, the scope of the present invention for which protection is sought should be understood as including the invention as described in the appended claims as well as any equivalents thereto, without the present invention being restricted to the above-mentioned embodiments.

INDUSTRIAL APPLICABILITY

The present invention provides effective monitoring of the state of combustion oscillations in a turbine at a plant from a remote monitoring center at reduced communication costs. Hence, it prevents combustion oscillations from reaching a critical state which may result in tripping even when the turbine is designed for reduced NOx emission.

What is claimed is:

1. A method for monitoring at a remote monitoring center a turbine driven by a supply of high temperature combustion gas generated by combustion in a combustor, the method comprising:

first receiving and monitoring a second data including representative values within a predetermined period of time in a first communications mode at a plant in which the turbine is installed, wherein the second data is generated based on a first data concerning a combustion oscillation of the combustion gas in the combustor obtained on a real-time basis in a normal state; and second receiving and monitoring the first data from the plant in a second communications mode at a speed which is higher than a speed of the first communications mode in the event of an abnormal state in which the second data is close to a value representing a predetermined critical state, wherein an instruction is sent to the plant to reduce turbine operation power when a symptom is detected of the predetermined critical state from the monitored first data.

2. The method according to claim 1, wherein the first receiving and monitoring includes receiving operation control parameter values for the turbine in the first communications mode and monitoring the operation control parameter values.

3. The method according to claim 2, wherein the second receiving and monitoring includes receiving the second data in the first communications mode and monitoring the second data as well.

4. The method according to claim 2, wherein the first receiving and monitoring includes allowing the second communications mode to be established with the plant to receive the first data, after detecting that the second data to be monitored has reached the abnormal state.

5. The method according to claim 2, further comprising recording and analyzing the first and second data and operation parameter values upon detection of a symptom of the critical state.

6. The method according to claim 1, further comprising:
checking whether a first combination data containing a combination of the first data and turbine operation parameter values is similar to a second combination data leading to the critical state in a plant; and
issuing a predetermined notice if the first and second combination data are similar.

7. A turbine monitoring system comprising a plant in which a turbine is driven by a supply of high temperature combustion gas generated by combustion in a combustor, and a turbine monitoring center which is connected via a communications line to the plant and located in a place remote from the plant,
wherein the monitoring center comprises:
first means for receiving and displaying a second data comprising representative values within a predetermined period of time from the plant in a first communications mode, wherein the second data is generated based on a first data concerning combustion oscillations of the combustion gas in the combustor obtained on a real-time basis in a normal state, and
second means for receiving the first data from the plant in a second communications mode at a speed which is higher than a speed of the first communications mode in the event of an abnormal state in which the second data is close to a value representing a predetermined critical state, and
wherein an instruction is sent to the plant to reduce turbine operation power when a symptom is detected of the predetermined critical state from the first data.

8. A method for monitoring at a remote monitoring center a turbine driven by a supply of high temperature combustion gas generated by combustion in a combustor, the method comprising:
first receiving and monitoring a second data containing representative values within a predetermined period of time in a first communications mode at a plant in which the turbine is installed, wherein the second data is generated based on a first data concerning an operational state of the turbine obtained on a real-time basis in a normal state; and second receiving and monitoring first data from the plant in a second communications mode at a speed which is higher than a speed of the first communications mode in the event of an abnormal state in which the second data is close to a value representing a predetermined critical state, wherein an instruction is sent to the plant to reduce turbine operation power when a symptom is detected of the predetermined critical state from the monitored first data.

9. A remote-controllable plant comprising a turbine which is driven by a supply of high temperature combustion gas generated by combustion in a combustor, the plant further comprising:
means for detecting first data on combustion oscillation of the combustion gas in the combustor on a real-time basis in a normal state;
means for generating second data including representative values within a predetermined period of time based on the first data;
first communications means for transmitting the second data in a first communications mode from the plant in which the turbine is installed; and
second communications means for transmitting and receiving the first data from the plant in a second communications mode at a speed which is higher than a speed of the first communications mode in the event of an abnormal state when the second data is close to a value representing a predetermined critical state,
wherein an instruction is sent to the plant to reduce turbine operation power when a symptom is detected of the predetermined critical state from the first data.

10. A plant according to claim 9, wherein the first communications means transmits an operation control parameter value for the turbine in the first communications mode.

11. A plant according to claim 9 or 10, wherein the second communications means transmits the second data in the first communications mode.

12. A plant according to claim 10, further comprising third communications means for checking whether a first combination data including a combination of the first data and a turbine operation control parameter value for the turbine is similar to a second combination data leading to the critical state and for issuing a predetermined notice if the first and second combination data are similar.

13. A monitoring center for remote-controlling a plant including a turbine which is driven by a supply of high temperature combustion gas generated by combustion in a combustor, comprising:
first communications means for receiving a second data including representative values within a predetermined period of time from the plant in a first communications mode, wherein the second data is generated based on a first data on combustion oscillation of the combustion gas in the combustor obtained on a real-time basis in a normal state; and
second communications means for receiving the first data from the plant in a second communications mode at a speed which is higher than a speed of the first communications mode in the event of an abnormal state in which the second data is close to a value representing a predetermined critical state,
wherein an instruction is sent to the plant to reduce turbine operation power when a symptom is detected of the predetermined critical state from the first data.

14. A monitoring center according to claim 13, wherein upon detection of the second data having reached the abnormal state, the first communications means allows the second communications mode to be established with the plant and permits the first data to be received.

15. A monitoring center according to claim 14, further comprising means for recording and analyzing the first and second data and operation parameter values for the turbine when a symptom of the critical state is detected.

* * * * *